June 5, 1945.  O. H. DICKE ET AL  2,377,617
ELECTRIC CLOCK SYSTEM
Original Filed Jan. 14, 1939   2 Sheets-Sheet 2

INVENTORS
O.H.Dicke and R.H.Dicke
BY
THEIR ATTORNEY

Patented June 5, 1945

2,377,617

UNITED STATES PATENT OFFICE 2,377,617

ELECTRIC CLOCK SYSTEM

Oscar H. Dicke and Robert H. Dicke,
Rochester, N. Y.

Continuation of application Serial No. 250,964,
January 14, 1939. This application June 14,
1941, Serial No. 398,129

12 Claims. (Cl. 58—24)

This invention relates to clock systems including master clocks for such systems, in which systems the secondary clocks are operated by alternating current synchronous motors and wherein the master clocks are, during the presence of alternating current, dominated or otherwise regulated by such alternating current, and is an improvement over the prior applications of O. H. Dicke, Ser. No. 365,584, filed May 23, 1929, now Patent No. 2,248,164, dated July 8, 1941; Ser. No. 441,109, filed April 2, 1930, now Patent No. 2,331,267, dated October 5, 1943; Ser. Nos. 729,079 and 729,080, filed June 5, 1934, now Patents Nos. 2,248,165 and 2,185,334, respectively, and dated July 8, 1941, and January 2, 1940, respectively; Ser. No. 239,538, filed November 8, 1938, now Patent No. 2,359,973, and Ser. No. 245,700, filed December 14, 1938, now Patent No. 2,313,466, dated March 9, 1943; and the prior application of R. H. Dicke, Ser. No. 39,146, filed September 4, 1935, now Patent No. 2,151,317, dated March 21, 1939, and constitutes a continuation application of our co-pending application Ser. No. 250,964, filed January 14, 1939, which became abandoned on June 21, 1941.

In many former clock systems, including some systems wherein alternating current synchronous motors are employed for actuating the secondary clocks cumbersome and expensive mechanism is employed. These systems usually include electrically controlled mechanisms such as relays and electric clutches for correcting such secondary clocks, as for instance, after a current cessation.

In accordance with the present invention it is proposed to so construct the clock systems that the secondary clocks, of which there may be a large number, are of rather simple and inexpensive construction. One object of the present invention is to so construct the secondary clocks that increased voltage or increased frequency, depending on the particular system used, will cause the secondary clock to operate at increased speed until it reaches a predetermined chronological condition. At this predetermined chronological condition the momentary termination of current, irrespective of its voltage or frequency, will in one form of the invention cause the secondary clock to be again advanced at a speed depending on the voltage or frequency, depending on the particular system under consideration. In another form of the present invention the current is shifted to another circuit to cause the secondary clock to be advanced.

Another object of the present invention resides in the provision of master clocks which will operate in sub-synchronism with the frequency of alternating current of regulated frequency so long as current is available and which will keep substantially correct time during a current cessation.

More specifically one of these master clocks includes an oscillatory member which through suitable mechanism drives a time shaft and which includes a local source of energy and means for impulsating such member each time the amplitude of oscillation of such member falls below a predetermined value in such manner that the successive phase shifts produced by such impulses, whether advancing or retarding phase shifts, cause said member to drive said time shaft to very accurately reflect the passing of time, and additionally includes alternating current controlled means for dominating said member so as to operate in synchronism with such alternating current and so as to cause this member to be operated at an amplitude above this predetermined value so that this alternating current controlled means performs a double function of keeping the member in sub-synchronism and of keeping the local source of energy from being dissipated. In one specific embodiment of master clock the oscillation of the oscillating member is kept at or above a predetermined amplitude by the intermittent dropping of a weight. In one specific form of these master clocks as illustrated it is proposed to dominate the oscillation of such oscillating member through the medium of a very weak spring driven by a synchronous motor.

In addition to the foregoing objects, purposes and characteristic features of the present invention it is proposed to so construct the master clocks and clock systems that secondary clocks of very simple construction operated entirely by alternating current of regulated frequency indicate substantially the same time irrespective of temporary current cessation and wherein the secondary clocks include no apparatus in addition to a synchronous motor and a clock train except contacts manifesting chronological conditions or blocking means to at times physically block operation of such secondary clock.

It is also proposed in accordance with the present invention to correct secondary clocks through the medium of contacts associated with the master clock and contacts associated with the secondary clock so that the secondary clock will operate at an average speed dependent upon the condition of correspondence existing between these contacts.

Other objects, purposes and characteristic features of the present invention will be in part more particularly pointed out hereinafter and is in part obvious from the accompanying drawings in which—

Figs. 1A and 1B are enlargements of portions of the system shown in Fig. 1.

Figure 1:
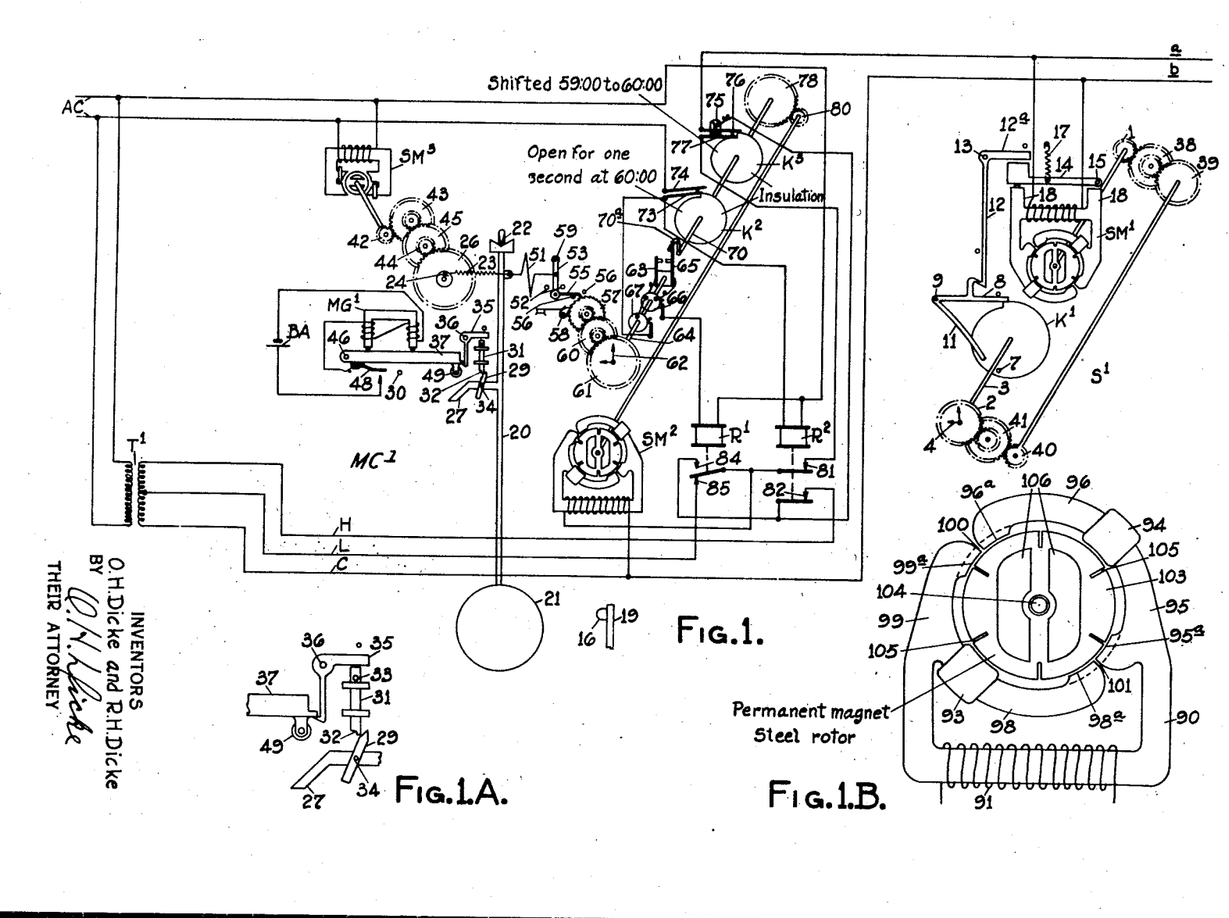
Fig. 1 illustrates a clock system embodying the present invention including a novel master clock and secondary clock.

*Fig. 1 structure*

Referring to Fig. 1, the structure shown therein is of two parts, namely, a master control clock and one or more secondary clocks of which only one is shown.

Both the secondary and master clocks utilize a two-speed, self-starting, synchronous motor so designed as to operate at one synchronous speed for low voltage or low frequency excitation and at a higher synchronous speed for high voltage or high frequency excitation. The motors are utilized in the following way. During a power failure the secondary clocks are not operating, so immediately after a power failure high voltage is fed to the secondary clocks for the right length of time to bring them up by the amount which was lost during the power failure. Also each secondary clock is corrected once an hour. This is accomplished by supplying high voltage to the clocks for the last minute or other suitable time interval in a way which will be described in more detail in the following paragraphs.

Referring now to Fig. 1 the secondary clock comprises a two-speed self-starting synchronous motor SM¹ to be described in more detail later. The synchronous motor SM¹ through pinion 1 and gear train 38, 39, 40 and 41 drives the hour shaft 3 through gear 2. Clock hands 4 are actuated by shaft 3. The cam K¹ supporting pin 7 is rigidly connected to shaft 3. The cam lever 8 is pivoted on pin 9 and supports arm 11, which in the upper position blocks pin 7 and stops rotation of cam K¹. The cam lever 8 is latched up by the latch lever 12 pivoted at 13 and operated by anvil 12ª. The latch lever 12 is actuated by the armature 14 pivoted at 15. The armature 14 is biased to the upward position by the spring 17 and is actuated by the extended pole pieces 18 built out on the stator of the motor SM¹.

Referring now to the master clock correcting means in Fig. 1, this is composed of two parts, the master clock proper and the auxiliary mechanism for utilizing the master clock to regulate or correct the secondary clocks. The master clock proper is of a type which keeps time in accordance with the frequency of the regulated A. C. power supply so long as power is on the power line and which operates to indicate substantially correct time under its own power as a mechanical clock while power is off.

Referring now to the master clock portion of Fig. 1. Pendulum 20 with a heavy bob 21 is supported at pivot 22. Bumper 19 is so positioned as to restrict the amplitude of pendulum 20. Pendulum 20 is actuated by spring 23 supported or hooked on eccentric pin 24. Eccentric pin 24 is supported on gear wheel 26 which is driven through gear train 42, 43 and 45 by self-starting synchronous motor SM³. This gear train drives gear 26 at the same speed as the natural frequency of pendulum 20. The pendulum 20 carries a side arm 27 which is best shown in the enlargement in Fig. 1A. This side arm 27 supports on pin 34 a flipper 29 which is freely pivoted thereon and has its center of gravity below the pin. In juxtaposition to the flipper 29 is a trigger or pin 31 with a notch 32, being kept in normal position by pin 33. When pin 31 is raised due to the engagement of flipper 29 in notch 32 it actuates latch lever 35 pivoted on pin 36. Latch lever 35 latches armature 37 in the upper position.

Referring again to Fig. 1 the armature 37 is pivoted on pin 46 and carries a contact member 48 which when the armature 37 is in the lower position makes contact completing the circuit from the battery BA through the electro-magnet MG¹ causing the armature 37 to jump again into the latched uppermost position. The armature 37 carries a roller 49 which in dropping rides on side arm 27 of the pendulum 20.

The remainder of the master clock proper consists of a clock gear train and a ratchet mechanism. Pin 59 carries an actuating lever 53 actuated by pendulum 20 through spring 51 and is used for actuating pawl 55. Limit pins 52 limit the stroke of lever 53. Lever 53 carries a ratchet pawl 55 which actuates ratchet wheel 57 with the aid of the stationary pawl 58 which prevents retrograde motion of the ratchet wheel during retrograde movement of pawl 55. Ratchet wheel 57 drives clock hands 62 through gear train 60—61. This above described mechanism constitutes the master clock proper.

The minute shaft 64 of the master clock carries contacts 63 and 65 the leads of which are taken off by slip rings 66 and 67. In juxtaposition to these contacts 63 and 65 is the crank 70ª carried on shaft 70 and so positioned as to engage the contact 65 which is longer than the contact 63, and thereby opens the contacts 63 and 65. The shaft 70 in alignment with shaft 64 carries insulated cams K² and K³ which actuate contacts 73—74 and 75—76. Shaft 70 is driven through gears 78 and 80 by the two-speed self-starting synchronous motor SM². Relays R¹ and R² and transformer T¹ are employed to control and energize suitable circuits as more particularly described hereinafter.

*Fig. 1 operation*

During normal operation the secondary clocks as above described run as ordinary A. C. self-starting synchronous motor clocks deriving their power from the controlled frequency A. C. power lines except that during the last minute of every hour high voltage is supplied to these clocks causing their two-speed motors to run at the higher speed and thereby correct for any slight errors in their time indicating positions. In case of power failure the secondary clocks stop, but immediately after such power failure is terminated high voltage is supplied to the secondary clocks for such a period of time as is necessary to cause them to again indicate correct time.

Referring again to the secondary clock portion of Fig. 1, the operation is as follows. The two-speed synchronous motor $SM^1$ through gear train 1, 38, 39, 40, 41 and 2 drives clock hands 4 and cam $K^1$ on minute shaft 3. The pin 7 which preferably carries a roller, is so positioned on the cam $K^1$ as to strike the end of the arm 11 at the even hour position, providing the arm 11 is in the latched up position. The arm 11 is so positioned that the resultant torque about the point 9 is substantially zero. The cam $K^1$ is so positioned on shaft 3 that cam lever 8 is freed therefrom immediately, say within one minute, before the even hour position. The normal operation then is as described in the following paragraph.

Let us assume that the time as indicated on the master clock is 58 minutes after the hour and that there has been no power failure during this hour, the two-speed self-starting synchronous motor $SM^1$ is therefore energized through the medium of the clock system distribution lines $a$, $b$ through the following circuit: starting at the mid-tap of transformer $T^1$ through back contact 85 of relay $R^1$, front contact 81 of relay $R^2$, contacts 77—76 operated by cam $K^3$, over line $a$ through winding of synchronous motor $SM^1$, to line $b$ through common return wire C back to transformer $T^1$. Now when the master clock indicates the 59th minute of the hour position the snap action contacts 76—77 open and the snap action contacts 75—76 close. This action is so rapid that there is no appreciable break in power supplied to the motor $SM^1$, and the armature 14 is not released. The circuit is now through contacts 75—76 and contact 82 of relay $R^2$ to the high voltage tap H of the transformer $T^1$. This causes the motor $SM^1$ to operate at its high speed, which is preferably three times normal speed, until pin 7 engages the end of arm 11 stalling the motor $SM^1$. Now at the even hour position of the master clock the contacts 73—74 and 75—76 open and the contacts 76—77 reclose. The opening of contacts 73—74 causes the relay $R^2$, which is energized through these contacts 73—74, to drop, opening the circuit to the motor $SM^1$ for about one second. This releases the armature 14 of the motor $SM^1$ causing it to strike the arm 12a of the latch lever 12, unlatching arm 8 and in turn the arm 11 and releasing pin 7. The contacts 73—74 close after about one second which causes picking up of relay $R^1$ causing the system to resume normal operation. The secondary clock thus starts from the zero position of the hour when the master clock assumes the zero minute position. As shown the motor $SM^1$ has a high synchronous speed which is three times its low synchronous speed. Thus in one correction extending through a minute operation of the master clock it can correct a loss of two minutes.

In case of power failure the master clock keeps operating in a manner to be described later, but the remainder of the system is stationary. Thus, shaft 70 is stationary but the minute shaft 64 of the master clock keeps rotating. This causes contacts 63—65 to close.

Upon resumption of alternating current power relay $R^1$ is energized through contacts 73—74 and contacts 63—65 in series. This picking up of relay $R^1$ opens back contact 85 and closes front contact 84 of relay $R^1$. This causes the high voltage to be fed to the motors $SM^1$ and $SM^2$ from high voltage tap H through the contacts 82 and 84 in series, instead of low voltage being fed through back contact 85. This causes the motors $SM^1$ and $SM^2$ to run at their high synchronous speed. Thus shaft 70 catches up with shaft 64, so to speak and causing opening of contact 63—65 and causing the system to resume normal operation. Since the motors $SM^1$ and $SM^2$ are similar and operate at the same speed for like voltages the secondary clocks will again indicate correct time.

However, there is a possible difficulty in a power outage correction that extends through the even hour position. Provision must be made for unlatching the arm 8 so as to allow the secondary clock to run through the even hour position during a correction resulting from power failure and being made through front contact 84 of relay $R1$ and contacts 76—77 controlled by cam $K^3$.

Let us now assume that a current cessation occurs at the fifty-five minute position of both the master clock and the secondary clock and that this current cessation continues for ten minutes. The master clock hands will then, upon termination of the current cessation, assume the five minute position, whereas the secondary clock shaft 3 and the follower or catch-up shaft 70 will still be assuming the 55 minute position. Since the contacts 63—65 have now been closed, because the shaft 70 is tardy with respect to shaft 64, the relays $R^1$ and $R^2$ both assume their attracted position upon the return of alternating current. For reasons above given the synchronous motors $SM^1$ and $SM^2$ are both operated at high speed (triple speed) so that the secondary clock $S^1$ and the shaft 70 are both catching up with the master clock, so to speak. After 1⅔ minutes of operation of the master clock the shaft 70 and the secondary clock hour shaft 3 assume the 60 minute position, in which position of shaft 3 and cam $K^1$ the arm 8 is latched up. At the 60 minute position of the master clock shaft 70 the contacts 73—74 open resulting in deenergization of the relay $R^1$ and $R^2$. Dropping of the relay $R^1$ results in reducing the voltage applied to the synchronous motor $SM^2$ from high voltage to normal voltage resulting in normal speed operation of the rewind motor $SM^2$. Dropping of the relay $R^2$ results in opening of contacts 81 and 82 and in opening of both of the circuits for feeding energy to the line wire $a$, and results in deenergization of the secondary clock motor $SM^1$. Deenergization of synchronous motor $SM^1$ causes it to release its tractive armature 14, causing it to strike the arm 12a and release the latch 12, thereby causing the end of arm 11 to disengage the roller or pin 7, allowing the secondary clock to operate freely. This deenergization of relay $R^2$ continues only for about one second but long enough to cause the tractive armature 14 to release. If desired suitable dash-pot or other means may be employed to make the armature 14 slow releasing. The secondary clock $S^1$ is tardy only one second with respect to the shaft 70 which tardiness is due to the fact that the circuit for motor $SM^1$ was open for one second during which time the motor $SM^2$ was energized at low voltage. When the master clock hand 62 assumes the ten minute position the shaft 70 will also assume the ten minute position, thereby causing the contacts 63—65 to open and causing the relay $R^1$ to drop to its normal deenergized position. This removes high voltage from the motor $SM^2$ and from the motor $SM^1$ of the secondary clock thereby causing the secondary clock, now one second slow, to resume operation at normal speed. At the end of the next hour this one second error of the secondary clock $S^1$ will of course be corrected in a manner as already described. It is thus seen that the secondary clock S¹ is corrected after each current cessation and is also corrected after each of a plurality of equal time periods such as an hour. It is desired to point out here that, if desired, the synchronous motors SM¹ and SM² of Fig. 1 may be of any suitable construction so long as they are self-starting and will operate at double speed if double frequency current of suitable voltage is applied thereto. In other words, the transformer T¹ may be replaced by the transformer T⁷ and the frequency doubler FD of Fig. 4 in the event such a synchronous motor is used and the Fig. 1 system is to be modified from a two voltage system to a two frequency system. The operation of the master clock MC¹ under normal conditions and during a current cessation will now be described.

*Operation of master clock Fig. 1*

The operation of the master clock portion of Fig. 1, namely, the elements having reference numbers 20 to 64, can be conveniently considered under two separate headings, firstly normal operation, and secondly operation during power failure. We will first consider the normal operation. The synchronous motor SM³ through gear train 42—45 drives gear wheel 26 supporting eccentric pin 24. This sinusoidal motion of pin 24 through spring 23, which is always under tension, impresses a sinusoidal force on the pendulum 20. As is shown in the theory of mechanics, this causes a vibration having the same period as the impressed force to be set up in the pendulum 20. The strength of the spring 23 is so adjusted that the amplitude of the resultant vibration is so great for ordinary variation in frequency that the flipper 29 (Fig. 1A) completely clears the latch pin 31 on the swing to the left so that on the return swing to the right the flipper does not catch in the notch 32 (see Fig. 1A). Thus under normal operation the armature 37 remains in the latched up position and the battery BA is not used. The bumper 19, although not essential, is preferably used for reasons given below. In practice the strength of the spring 23 is so adjusted as to cause the amplitude of the pendulum 20 to be great enough to strike the bumper 19 having a rubber impactor 16. This effectively limits the amplitude of the pendulum 20 and not only protects the clock from damage due to too great an amplitude but which also enables the clock to operate over a greater variation in frequency of the alternating current.

Coming now to the second phase of the operation of the master clock in case of power failure the synchronous motor SM³ stops and the spring 23 no longer exerts the above mentioned sinusoidal force. The pendulum now operates as an ordinary damped pendulum slowly decreasing in amplitude. The pendulum bob 21 is made very heavy so as to cause this decrease in amplitude to be very slow. When the amplitude of the pendulum 20 has decreased enough so that on its swing to the left the flipper 29 does not completely clear latch pin 31 with the pendulum swinging to the right, the flipper 29 therefore catches in the notch 32 (see Fig. 1A) of the latch pin 31, forcing it up and causing it to operate latch lever 35 and so unlatch armature 37 and allow it to drop toward the stop pin 30. This allows the armature 37 to fall until the roller 49 strikes the inclined member 27 of the pendulum 20. This exerts a force on the pendulum in a direction to increase its amplitude. The armature 37 continues to fall until the contact 48 closes causing energization of magnet MG¹ which causes the armature to again jump into the latched-up position. The amplitude of the pendulum 20 is once more great enough so that the flipper 29 clears latch pin 31 but is insufficient to strike the bumper 19, and the above process repeats itself each time the amplitude has fallen sufficiently to unlatch the armature 37. The clock is so designed that the impulse from the armature 37 acting on pendulum 20 comes near the center of the swing of pendulum 20. This is done so that the impulse does not cause an appreciable shift in the phase of the pendulum. Whatever shift in phase there is however is compensated for by adjusting the pendulum high or low depending on the direction of the phase shift.

We have examined the normal operation of the master clock pendulum, also operation during power failure. We now wish to briefly consider the synchronization of the pendulum in reverting to normal operation after a power failure. In general as the synchronous motor starts, neither the phase nor the amplitude of the pendulum is right for normal operation. This means that there will exist a transient in the pendulum vibration and since the pendulum 20 is so designed as to have a low air resistance this transient would be a long time in being damped out. This difficulty is avoided in the following way. If the phase relation should be such as to cause the amplitude of the pendulum to fall, it falls until it unlatches armature 37. This gives the pendulum an impulse, and this impulse is such as to help remove the transient vibration. If the amplitude increases, it does so until it strikes the bumper 19. Striking the bumper advances the phase and this continues until the phase has been advanced to such a point that the pendulum is in a condition of normal operation. Thus the bumper 19 acts as an upper limit and the apparatus 27—48 as a lower limit for the pendulum amplitude.

The pendulum 20 through the spring 51 actuates the lever 53 which in turn ratchets the ratchet wheel 57 one tooth per cycle of the pendulum. The spring 51 is provided to enable the clock to operate for various amplitudes of the pendulum 20. The ratchet wheel 57 through gear train 60—61 drives the clock hands 62 and the shaft 64. The ratchet lever 53 is limited in its movement in opposite directions to an extent so that the ratchet pawl 55 pivoted to the ratchet lever 53 can advance the ratchet wheel 57 only one tooth for each left to right stroke of the ratchet lever 53. Also two fixed stop pins 56 are provided one of which limits the downward movement of ratchet pawl 55 and the other of which causes binding action to prevent overthrow of the ratchet wheel 57. The spring 51 is of course stiff enough to transmit the force necessary to operate the master clock shaft. The fixed pawl 58 serves to prevent retrograde motion of the ratchet wheel 57.

*Fig. 1B structure*

In Fig. 1B is illustrated a self-starting two-speed synchronous motor. It is of the type which employs magnetic hysteresis to produce a starting torque, and then utilizes the magnetic retentivity of the steel rotor for synchronization. In particular, referring to Fig. 1B, 90 is a laminated soft iron stator having pole pieces 95—96 and 98—99. The reference character 91 designates an energizing winding thereon. Copper shading bands 93 and 94 divide the pole pieces into unshaded portions 95 and 99 and shaded portions 96 and 98. The air gaps 100 and 101 separate the poles 96 and 99, also 95 and 98. There are extensions 95ª, 96ª, 98ª, and 99ª on the pole pieces 95—96 and 98—99. These extensions are preferably but a few laminations thick. The shaded and unshaded pole portions 96, 98 and 95, 99, respectively, are in quadrature with respect to each other and produce a two pole rotating field when the core structure is highly saturated. The pole extensions 95ª, 96ª, 98ª and 99ª bear the same angular relation to each other as do certain shaded and unshaded portions of the poles of a six pole machine, and these extensions alone carry a substantial amount of flux when low voltage is applied to the motor winding 91. The rotor 103 of this two-speed motor is supported on shaft 104 and is stamped from a single lamination of hardened steel. Around the periphery of the rotor are six equally spaced slots 105, and in the central region are stamped two bilaterally symmetrical holes 106 as shown. These slots 105 and bilateral openings create two sets of preferential magnetic paths through the rotor and around the periphery. There are three such preferential magnetic paths formed by the slots 105 resulting in six residual magnetic poles when the motor operates at its low synchronous speed when energized at low voltage and there is formed one preferential magnetic path due to the holes 106 which results in a two pole residual magnetic structure when the rotor operates at the high synchronous speed due to the application of high voltage.

*Fig. 1B operation*

The two synchronous speed operation of the motor illustrated in Fig. 1B depends upon the non-linearity of the permeability of the iron used in its construction. Under low voltage operation the pole extensions 95ª, 96ª, 98ª and 99ª are the effective poles of the machine and the motor operates as a six pole machine. However, for high voltage excitation these pole extensions, which are reduced thickness, become saturated and the whole pole 95—96 also 98—99 becomes effective and the motor operates as a two pole machine. Let us consider first the low voltage operation.

Referring to Fig. 1B for low voltage excitation we have the following operation. The pole extensions 95ª, 96ª, 98ª and 99ª can be regarded as forming a six pole stator in which some of the poles are omitted. This causes the motor to operate as a six pole synchronous motor of the ferrous hysteresis type. The slots 105 divide the rotor 103 into six pole pieces. After synchronous speed has been reached these poles take on a permanent magnetization. The direction of magnetization alternate for consecutive poles of the six poles of the rotor.

For high voltage excitation the pole extensions 95ª, 96ª, 98ª and 99ª become saturated and the whole of poles 95—96 and 98—99 becomes effective. Under these conditions the stator is two pole and produces a two pole rotating field. This two pole field now has a synchronous speed of three times that of the six pole field and the motor operates at a synchronous speed of 3600 R. P. M. for 60 cycle excitation instead of operating at 1200 R. P. M. The oblong holes 106 leave a magnetic path of low magnetic reluctance in one direction through the rotor 103 and this serves to lock the rotor in at high synchronous speed and thereby eliminates the slow slip which is otherwise present.

It is thus seen that in the master clock illustrated in Fig. 1 the alternating current not only functions to dominate the pendulum but it also serves as a cut-out device to cut-out the local source of energy, in the form of a battery, so that no power-off relay such as would ordinarily be used is required.

Figures 2, 3, 4:
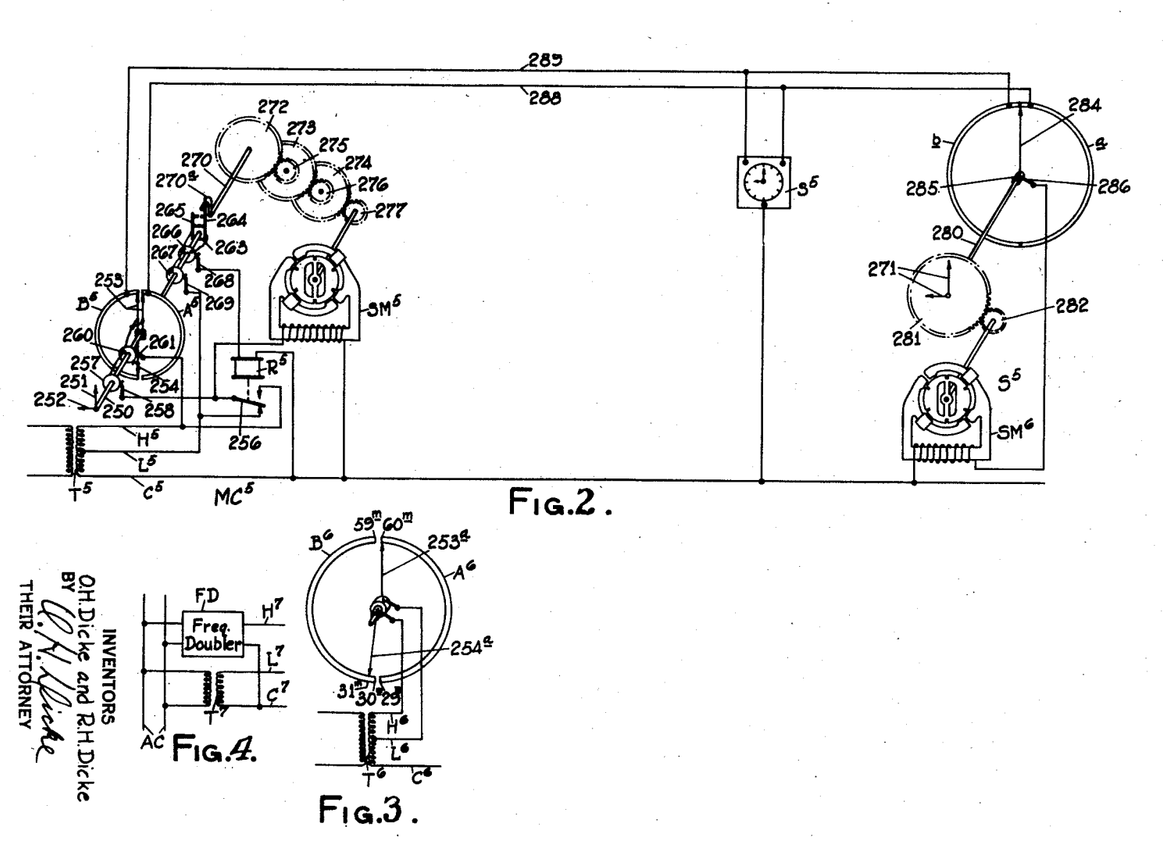
Fig. 2 illustrates a modified clock system in which secondary clock correction is obtained in accordance with the condition of correspondence and non-correspondence of contacts associated with the master clock and the secondary clock.
Fig. 3 illustrates how the master clock of Fig. 2 may be modified to cause a supplemental correction to be made upon all secondary clocks during the last minute of each hour.
Fig. 4 illustrates how two frequencies instead of two voltages may be used in the clock system illustrated in Fig. 2.

*Fig. 2 structure*

In Fig. 2 is illustrated a modified clock system employing secondary clocks each including a synchronous motor which will operate at high speed or at low speed in accordance with whether the alternating current voltage is high or low, respectively, these motors being such as employed in Fig. 1 and illustrated on an enlarged scale in Fig. 1B. In this system the secondary clocks are at times held in a predetermined chronological condition by the opening of contacts rather than by being physically blocked at predetermined chronological conditions as is the case in the system of Fig. 1. Also the system of Fig. 2 operates on the principle that if suitable contacts of the master clock and similar contacts of the secondary clock are not in correspondence the secondary clock will either operate at increased speed or will be held at stop, depending upon which of these contacts is leading the other.

Referring to Fig. 2 the master clock may be of any suitable construction insofar as the operating means for the master hour shaft 250 is concerned, so long as it is a master clock dominated or regulated by alternating current of regulated frequency, so as to operate in sub-synchronism with such frequency. In other words, the shaft 250 is driven by a master clock such as shown in Fig. 1 of this application or as shown in any one of the prior applications above referred to.

This master clock shaft drives clock hands 251 and 252 and also drives a double contact arm 253 and a single contact arm 254, and rotates preferably at a speed of one revolution per hour. This shaft has been illustrated in the sixty minute or zero minute position. In this zero minute position the double contact 253 moves from the contact sector $B^5$ to the contact sector $A^5$, and the contact arm 254 which did not touch either of the segments $A^5$ or $B^5$ during the last minute of the hour begins to engage the segment $B^5$. The segments $A^5$ and $B^5$ are of equal arcuate length and are separated by an arc of six degrees equal to one minute of movement of the contact arms 253 and 254. In other words, the double contact arm 253 engages the segment $A^5$ during the first thirty minutes of each hour and engages the segment $B^5$ during the second thirty minutes of each hour; whereas the contact arm 254 engages the segment $B^5$ between the zero minute and the 29 minute position of the master clock and engages the segment $A^5$ between the thirty minute and the fifty-nine minute position of the master clock shaft 250. Also, the contact arm 253 is connected to the movable contact 256 of the relay $R^5$ through the medium of the slip ring and brush 257—258, so that the contact arm 253 is connected to the high voltage tap $H^5$ of the transformer $T^5$ when the relay $R^5$ is up and is connected to the low voltage tap $L^5$ when the relay $R^5$ is down. Similarly, the contact arm 254 is continuously connected to the high voltage tap $H^5$ of the transformer $T^5$, through the medium of the slip ring 260 and the brush 261.

The shaft 250 also carries an insulating block 263 to which are secured contacts 264 and 265, which contacts are biased into engagement with each other. These contacts are connected in series with the relay $R^5$ and the lower portion of the secondary winding of the transformer $T^5$ through the medium of slip rings 266 and 267 and brushes 268 and 269.

In axial alignment with the master clock shaft 250 is a follower shaft 270 bent at one end to form a crank $270^a$, which crank is of a radius to engage contact 264 but not contact 265. This shaft 270 is driven at a speed of one revolution an hour by the synchronous motor $SM^5$ when this motor is energized by alternating current of low voltage derived from the tap $L^5$ of transformer $T^5$ as it normally is with the relay $R^5$ deenergized. The crank $270^a$, as shown, normally holds the contacts 264—265 open, and since the master clock containing shaft 250 is dominated by alternating current from the same source as controls the motor the shafts 250 and 270 rotate at exactly the same speed, and the contacts 264—265 remain barely open so long as no current cessation takes place. The shaft 270 is driven through the medium of a gear train including gears 272, 273 and 274 and pinions 275, 276 and 277.

Referring now to the secondary clocks $S^5$ of Fig. 2, two of which only have been illustrated, each of these secondary clocks includes a time shaft or hour shaft 280 and clock hands 271 driven through the medium of a gear train including gear 281 and pinion 282 by the synchronous motor $SM^6$. The hour shaft 280 drives a contact arm 284, which contact arm is in engagement with segment $a$ during the first thirty minutes of an hour and is in engagement with the segment $b$ during the second thirty minutes of each hour as manifested by the secondary clock. This contact arm 284 is connected to the winding of the synchronous motor $SM^6$ through the medium of a slip ring 285 and a brush 286, the other terminal of this winding being connected to the common return wire $C^5$. The segment $a$ of each secondary clock $S^5$ is connected to the segment $A^5$ of the master clock $MC^5$ by network 288, whereas segments $b$ and $B^5$ are connected together by network 289.

*Operation Fig. 2*

The electric clock system illustrated in Fig. 2 is one of the type which functions on the principle of correspondence. Stating this principle in a few words the contact arm 284 of each secondary clock $S^5$ tries to stay in perfect synchronism with the contact arm 253 of the master clock, because if it (contact 284) moves on segment $a$ just before the contact arm 253 moves on segment $A^5$ the synchronous motor $SM^6$ of the secondary clock will be deenergized and the secondary clock $S^6$ will stop until contact 253 also engages segment $A^5$, and if the contact arm 284 is still on the segment $b$ when the contact arm 253 begins to engage segment $A^5$ (the contact arm 254 engaging the segment $B^5$ at this same time) the synchronous motor $SM^6$ is energized over the high voltage circuit which may be traced as follows: beginning at the high voltage terminal $H^5$ of the transformer $T^5$, brush 261, slip ring 260, contact arm 254, segment $B^5$, wire 289, segment $b$, contact arm 284, slip ring 285, brush 286, winding of the synchronous motor $SM^6$, common return wire $C^5$ and back to the secondary winding of the transformer $T^5$. This high alternating current voltage, for reasons heretofore given, will cause this motor $SM^6$ to operate at its high synchronous speed, preferably triple normal synchronous speed, thereby causing the secondary clock to catch up, so to speak, with the master clock at least so long as the contact arm 284 remains in engagement with the segment $b$. It is thus seen that if a particular secondary clock $S^5$ is slow, possibly because it was temporarily disconnected, and is slow less than a half hour two-thirds of the tardiness of such particular secondary clock will be corrected at the end of each half hour as manifested by the secondary clock. For instance, if we assume that a secondary clock $S^5$ is tardy twenty-seven minutes, by reason of a temporary disconnection from the line, when the master clock is at the zero minute position. This tardiness will be reduced to nine minutes during the first half hour, will be reduced to three minutes during the second half hour, will be reduced to one minute during the third half hour, will be reduced to twenty seconds during the fourth half hour, and so on following the same arithmetical progression until the tardiness is negligible. It is thus seen that any tardiness of secondary clocks not in excess of twenty-nine minutes may be corrected by the out-of-synchronism condition of the contact arms 253 and 284 and without the picking up of the relay $R^5$. Or, in other words, the relay $R^5$ together with the contacts 264 and 265 and the synchronous motor $SM^5$ controlling them may be omitted, if desired.

As pointed out above if a secondary clock is slightly fast, namely, is fast less than one minute, it will move from a live segment $a$ or $b$ to a dead segment $b$ or $a$, as the case may be, and will be stopped and held in such stopped position until the master clock has reached the same position (secondary clock correct) at which time the secondary clock resumes normal speed operation and again indicates correct time. This functioning of the system is due to the fact that the contact am 254 of the master clock $MC^5$ does not engage either of the two segments $A^5$ or $B^5$ during the thirtieth and the sixtieth minute of each hour. The system of Fig. 5 thus causes any secondary clock that is slow twenty-nine minutes or less or is fast one minute or less to be corrected and this can be done irrespective of whether or not the relay $R^5$ and its control motor $SM^5$ are employed or omitted. In this connection it should be understood that the motors $SM^5$ and $SM^6$ are of a construction and function like the motor shown in Fig. 1B of the drawings. It should also be understood that the shafts 250 and 280 may make one revolution in any other suitable time period such as two hours, for instance.

Let us now observe what functions the relay $R^5$, when used, performs. Let us assume that a power failure or current cessation takes place at the two minute position of the master clock $MC^5$ and the secondary clock $S^5$ and that this current cessation continues for say fifty-five minutes. The master clock will then assume the fifty-seven minute position whereas the secondary clock still assumes the two minute position, the master clock being operated from a local source of energy all in a manner as explained in connection with Fig. 1 and the prior applications heretofore referred to. The crank $210^a$ of course still assumes the two minute position for which reason the contacts 264—265 are in their biased closed position. Upon return of the alternating current of regulated frequency the relay R⁵ assumes its energized position and applies high voltage instead of low voltage to the contact arm 253, so that both of the arms 253 and 254 apply high voltage to the segments A⁵ and/or B⁵. During the first two minutes of operation of the master clock MC⁵ high voltage is applied to both of the wires 288 and 289 and segments $a$ and $b$, but during the third minute high voltage will only be applied to the wire 289 and segment $b$. This is the case because the contact 254 is in the gap between segments A⁵ and B⁵ during the sixtieth minute of the master clock. Since the contact arm 284 assumes the eight minute position the secondary clock will be held at stop during this sixtieth minute of operation of the master clock. During this minute the catch-up motor SM⁵ was however operated at its high or triple speed through a circuit including front contact 256 of relay R⁵, and therefore the secondary clocks are slow to an extent of three minutes with respect to the catch-up shaft 270, which shaft now assumes the eleven minute position. During the next twenty-four and one-half minutes of operation of the master clock MC⁵ the shaft 270 fully catches up with the shaft 250 and the contacts 264—265 reopen, thus dropping the relay R⁵, causing the voltage applied to the contact arm 253 to be reduced to low voltage and causing the secondary clocks to be operated at normal speed instead of triple speed. The secondary clocks S⁵ are still three minutes slow with respect to the master clock MC⁵ as before and as above explained and this tardiness will be corrected in a manner and for reasons heretofore given.

Fig. 3 system construction and operation

The system of Fig. 3 is the same as the system of Fig. 2 either with the relay R⁵ employed or with this relay R⁵ omitted, except that the contact arm construction is modified and performs functions not performed by the system of Fig. 2.

In Fig. 2 the contact arm 253 is a double contact which spans the one minute gap between segments A⁵ and B⁵, whereas the corresponding contact arm 253ᵃ of Fig. 3 is a single contact which does not engage either of the segments A⁶ or B⁶ during the thirtieth and the sixtieth minute of each hour. It will be seen however that during the sixtieth minute of each hour the contact arm 254ᵃ applies alternating current of high voltage to the segment B⁶ and during the thirtieth minute applies alternating current of high voltage to segment A⁶. This construction causes a secondary clock which is tardy less than two minutes to be fully corrected during the last minute of an hour or during the thirtieth minute of an hour, as the case may be, depending on when such clock became tardy. This is a function not performed by the clock system of Fig. 2. Although the relay R⁵ has not been illustrated in Fig. 3 such a relay R⁵ may be used and if used performs the same functions as described in connection with Fig. 2.

Referring again to the contact arm construction of Fig. 3 the contact arm 254ᵃ performs a slightly different secondary clock retarding function than does its corresponding contact 254 of Fig. 2. This contact arm 254ᵃ leaves a particular segment A⁶ or B⁶ one minute earlier than does the contact 254 of Fig. 2, so that a secondary clock that is fast any amount less than two minutes will be corrected. This change with respect to contact arm 254ᵃ in construction also results in a loss of six minutes instead of three minutes of a secondary clock with respect to the catch-up shaft 270 of the master clock at the end of each half hour as manifested by the master clock, because one of the segments A⁶ or B⁶ and the corresponding secondary clock segment $a$ or $b$ will be entirely disconnected from alternating current at the end of such half hour for a period of two minutes instead of one as is the case in the Fig. 2 construction.

Fig. 4 system construction and operation

In Fig. 4 has been illustrated how the four systems described in connection with Figs. 2 and 3 may be further modified. In the prior applications of O. H. Dicke, Ser. Nos. 239,538 and 245,700 above referred to, now Patents Nos. 2,359,973 and 2,313,466, respectively, have been disclosed several forms of frequency doublers for changing a sixty cycle frequency alternating current, for instance, to a 120 cycle frequency alternating current. Referring now to the system illustrated in Fig. 2 if a double frequency either of the same voltage or of double voltage be substituted and supplied instead of the high voltage supplied in Fig. 2 ordinary synchronous motors could be substituted for the special synchronous motors SM⁵ and SM⁶ of Fig. 2, and the system of Fig. 2 so modified, as conveniently illustrated in Fig. 4, would function exactly the same as the system illustrated in Fig. 2. This modified system has been illustrated in Fig. 4, by illustrating in Fig. 4 how the transformer T⁵ of Fig. 2, irrespective of whether the relay R⁵ is used or omitted, may be replaced by the transformer T⁷ and the frequency doubler FD to constitute a modified system in which low frequency and high frequency alternating currents are alternately, in half hour periods, applied to the line wires 288 and 289. In the same manner the transformer T⁶ of Fig. 3 may be replaced by the frequency doubler FD and transformer T⁷ of Fig. 4 to constitute two additional modified systems depending on whether the relay R⁵ is or is not used in such modified system. Figs. 2, 3 and 4 thus illustrate eight modified forms of system shown rather completely in Fig. 2 of the drawings. The two-speed synchronous motor shown in Fig. 1B of the drawings is claimed in a divisional application.

The applicants have thus shown and described several forms of their invention including modified forms of master clocks constituting elements of these electric clock systems, and it should be understood that the systems illustrated have been selected to aid in the description of the principles employed and some manners in which these principles may be applied in practicing the invention, and that the invention is not limited to the particular constructions illustrated. For instance, any suitable synchronous motor which will operate at a low synchronous speed when low voltage is applied thereto and which will operate at a higher synchronous speed when alternating current of the same frequency but higher voltage is applied thereto may be substituted for the synchronous motor illustrated enlarged in Fig. 1B. Also, the system of Fig. 1 may be modified by employing ordinary self-starting synchronous motors which will operate at a speed depending on the frequency instead of employing the two-speed synchronous motors illustrated in Fig. 1 and by employing the two frequency power pack illustrated in Fig. 4 instead of the transformer T¹ employed in Fig. 1. It should therefore be understood that the present invention is not limited to the specific constructions illustrated except as demanded by the scope of the following claims.

What we claim as new is:

1. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current and a second source of alternating current adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; and a second contact operated by the shaft of said master clock for alternately connecting said second source to the other and then to said one of said circuits.

2. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current of low voltage and a second source of alternating current of high voltage adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; and a second contact operated by the shaft of said master clock for alternately connecting said second source to the other and then to said one of said circuits.

3. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current of low frequency and a second source of alternating current of high frequency adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; and a second contact operated by the shaft of said master clock for alternately connecting said second source to the other and then to said one of said circuits.

4. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current and a second source of alternating current adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; a second contact operated by the shaft of said master clock for alternately connecting said second source to the other and then to said one of said circuits; said first and second contact including means for applying voltage from said second source to said one circuit while no current is applied to said other circuit.

5. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current and a second source of alternating current adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; a second contact operated by the shaft of said master clock for alternately connecting said second source to the other and then to said one of said circuits; and supplemental means controlled by said master clock for causing the application of current from said second source to both of said circuits for a total period of time proportional to the duration of such current cessation.

6. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current of low voltage and a second source of alternating current of high voltage adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; a second contact operated by the shaft of said master clock for alternately connecting said second source to the other and then to said one of said circuits; and supplemental means controlled by said master clock and by current from said sources of alternating current effective after each current cessation to cause said first contact to apply said second source instead of said first source alternately to said circuits for a total period of time proportional to the duration of such current cessation.

7. In an electric clock system; the combination with a source of alternating current; of a master clock including a shaft rotated to substantially correctly manifest the passing of time; a secondary clock including a time shaft, a gear train, and a synchronous motor for operating such time shaft through the medium of said gear train; a first source of alternating current of low frequency and a second source of alternating current of high frequency adjacent said master clock, which first source of current will operate said secondary clock through the medium of its synchronous motor so as to substantially correctly manifest the passing of time and which second source if applied to said synchronous motor will cause said secondary clock to operate at increased speed; two circuits connecting said master clock and said secondary clock; a contact associated with said secondary clock for alternately connecting said synchronous motor to one and then the other of said circuits during operation of said secondary clock; a first contact operated by the shaft of said master clock for alternately connecting said first source to one and then the other of said circuits; a second contact operated by the shaft of said master clock for alternately connecting said second source to the other and then to said one of said circuits; and supplemental means controlled by said master clock and by current from said sources of alternating current effective after each current cessation from said sources to cause said first contact to apply said second source instead of said first source alternately to said circuits for a total period of time proportional to the duration of such current cessation.

8. In an alternating current electric clock system, the combination with a central location and a field location, a master clock shaft at said central location, a secondary clock shaft at said field location, means for driving said master clock shaft to correctly manifest the passing of time, a synchronous motor for driving said secondary clock shaft to substantially correctly manifest the passing of time, when energized by alternating current of one character, but to operate at a much higher speed when energized by alternating current of another character, two line circuits connecting said central location and said field location, contacts for connecting said synchronous motor in said line circuits alternately for substantially equal time intervals as manifested by said secondary clock shaft, and contacts controlled by said master clock shaft for alternately energizing one of said circuits with alternating current of said one character and of said other character and for alternately energizing the other of said circuits with alternating currents of said other character and of said one character in a manner such that neither of said circuits is energized by currents of both characters for any appreciable time.

9. In an alternating current electric clock system, the combination with a central location and a field location, a master clock shaft at said central location, a secondary clock shaft at said field location, means for driving said master clock shaft to correctly manifest the passing of time, a synchronous motor for driving said secondary clock shaft to substantially correctly manifest the passing of time when energized by alternating current of one character, but to operate at a much higher speed when energized by alternating current of another character, two line circuits connecting said central location and said field location, contacts for connecting said synchronous motor in said line circuits alternately for substantially equal time intervals as manifested by said secondary clock shaft, and contacts controlled by said master clock shaft for alternately energizing one of said circuits with alternating current of said one character and of said other character and for alternately energizing the other of said circuits with alternating currents of said other character and of said one character in a manner such that current of said one character is at all times applied to at least one of said circuits and alternating current of said other character is not applied to either of said circuits for a short time near the end of each of said time periods.

10. In an alternating current electric clock system, the combination with a central location and a field location, a master clock shaft at said central location, a secondary clock shaft at said field location, means for driving said master clock shaft to correctly manifest the passing of time, a synchronous motor for driving said secondary clock shaft to substantially correctly manifest the passing of time when energized by alternating current of one character, but to operate at a much higher speed when energized by alternating current of another character, two line circuits connecting said central location and said field location, contacts for connecting said synchronous motor in said line circuits alternately for substantially equal time intervals as manifested by said secondary clock shaft, and contacts controlled by said master clock shaft for alternately energizing one of said circuits with alternating current of said one character and of said other character for substantially equal time periods and for alternately energizing the other of said circuits with alternating currents of said other character and of said one character for substantially equal time periods in a manner such that if time is divided into equal time periods alternating current of said one character is applied to one of said circuits for a predetermined fraction of such period and then to the other of said circuits for said predetermined fraction of such period alternately with the time of application in each case ending at the end of such period, and alternating current of said other character is applied to the other of said circuits for said predetermined fraction of such period and then to said one circuit for said predetermined fraction of such period alternately with the time of application in each case starting at the beginning of such period, whereby said secondary clock shaft if fast will be temporarily stopped near the end of such period and if slow will be operated at increased speed near the end of such period.

11. In an alternating current electric clock system, the combination with a central location and a field location, a master clock shaft at said central location, a secondary clock shaft at said field location, means for driving said master clock shaft to correctly manifest the passing of time, a synchronous motor for driving said secondary clock shaft to substantially correctly manifest the passing of time when energized by alternating current of one character, but to operate at a much higher speed when energized by alternating current of another character, two line circuits connecting said central location and said field location, contacts for connecting said synchronous motor in said line circuits alternately for substantially equal time intervals as manifested by said secondary clock shaft, and contact mechanism controlled by the said master clock shaft for applying said current of one character and said current of said another character to each of said line circuits alternately in such manner that current of a particular character is applied alternately to one and then the other of said line circuits.

12. In an alternating current electric clock system, the combination with a central location and a field location, a master clock shaft at said central location, a secondary clock shaft at said field location, a source of alternating current of one character, means for driving said master clock shaft to correctly manifest the passing of time as determined by the frequency of alternating current from said source so long as available and to substantially correctly manifest the passing of time during a current cessation, a synchronous motor for driving said secondary clock shaft to substantially correctly manifest the passing of time when energized by alternating current of said one character, but to operate at a much higher speed when energized by alternating current of another character, two line circuits connecting said central location and said field location, contacts for connecting said synchronous motor in said line circuits alternately for substantially equal time intervals as manifested by said secondary clock shaft, and contact mechanism controlled by the said master clock shaft for applying said current of one character and said current of said another character to each of said line circuits alternately in such manner that current of a particular character is applied alternately to one and then the other of said line circuits.

OSCAR H. DICKE.
ROBERT H. DICKE.